A. ALAJ.
MECHANICAL WATER HORSE FOR AQUATIC SPORTS.
APPLICATION FILED MAR. 7, 1917.
1,253,329. Patented Jan. 15, 1918.
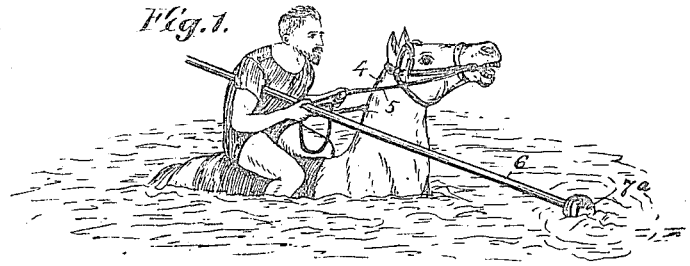
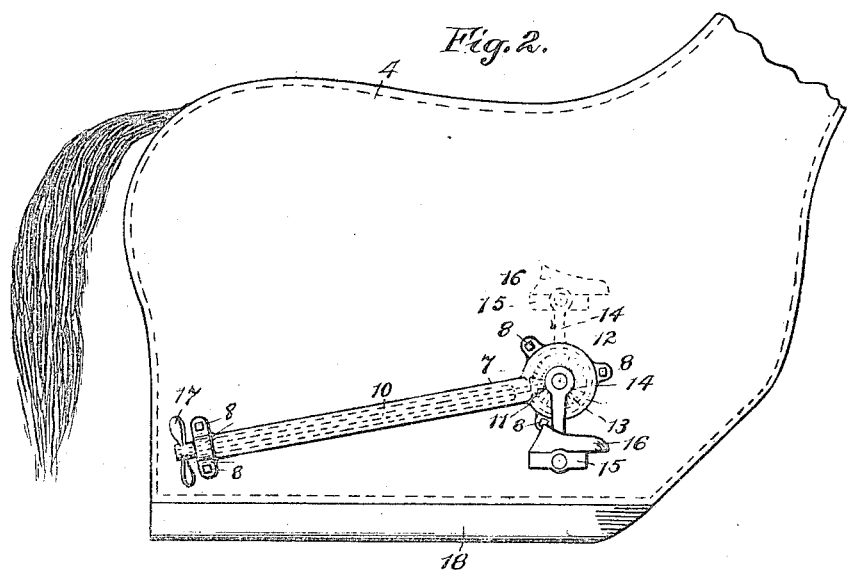
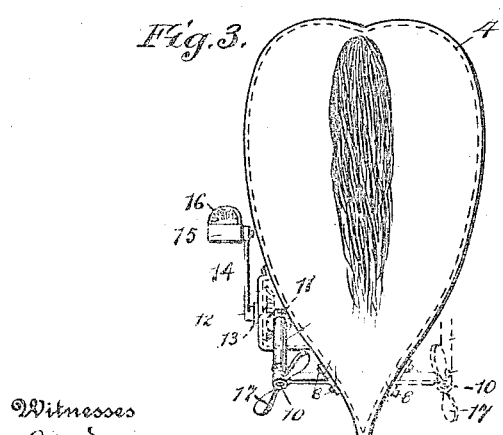
Witnesses
S. W. Brainard
M. A. Callopy
Inventor
Antonio Alaj.
By John A. Bommhardt
Attorney

UNITED STATES PATENT OFFICE.

ANTONIO ALAJ, OF CLEVELAND, OHIO.

MECHANICAL WATER-HORSE FOR AQUATIC SPORTS.

1,253,329.

Specification of Letters Patent.  Patented Jan. 15, 1918.

Application filed March 7, 1917. Serial No. 153,188.

*To all whom it may concern:*

Be it known that I, ANTONIO ALAJ, a citizen of the United States, residing at Cleveland, in the county of Cuyahoga and State of Ohio, have invented certain new and useful Improvements in Mechanical Water-Horses for Aquatic Sports, of which the following is a specification.

This invention is a mechanical water horse or float adapted for aquatic sports, and comprises a float having the form of a horse or similar animal, and especially used in a game or sport in which opposing parties are mounted on the float and endeavor by means of push poles or the like to push each other off, or overturn an opposing player.

The body or float is provided with propelling devices, one of which is located at each side thereof, and either or both of which may be operated, the operation of one or the other serving to give direction to or steer the body. The equilibrium of the float, when a rider is mounted thereon, is somewhat unstable, so that the object of the game can be more readily accomplished.

In the drawings—

Figure 1 is a perspective view illustrating the device.

Fig. 2 is a side elevation of the float or body.

Fig. 3 is a rear elevation.

Referring specifically to the drawings, 4 indicates a body having the form of a horse, or any other desired form, and provided with a weighted keel 18 which normally holds it upright. The body is hollow to give buoyancy, and may be provided with lines 5 for the rider to hold, and the rider carries a push pole 6 with a pad 7ª at the end, for the purpose of upsetting his adversary.

Fastened to each side of the body is a gear and shaft housing 7, which may be secured by bolts 8. One of these housings is arranged at each side, and each incloses the driving devices of a propeller 17. Each propeller is driven by a crank 14 and pedal 15 carrying a stirrup or shoe 16 to hold the rider's feet. The stub shaft 12 of the crank carries a gear 13 within the casing 7, which meshes with a bevel pinion 11 at the front end of the drive shaft 10 which carries a propeller 17.

When a rider is mounted on the horse he may propel the same by operating the cranks, or by operating only one crank he can turn or steer the body in a corresponding direction. By pushing with the push rod on the horse or body of his adversary he can upset him or knock him off and thereby accomplish the object of the device.

What I claim as new is:

A float of a form capable of being straddled by a rider, casings secured to opposite sides of the float at the front part thereof and each having a tubular housing extending rearwardly beside the float, a shaft in each housing provided with a propeller at its rear end, and independent pedal cranks mounted on the casings and geared to the shafts respectively.

In testimony whereof, I do affix my signature in presence of two witnesses.

ANTONIO ALAJ.

Witnesses:
JOHN A. BOMMHARDT,
G. W. ROSENBERG.

Copies of this patent may be obtained for five cents each, by addressing the "Commissioner of Patents, Washington, D. C."